US008699604B2

(12) United States Patent
Wang

(10) Patent No.: US 8,699,604 B2
(45) Date of Patent: Apr. 15, 2014

(54) SYSTEM AND METHOD FOR RELAYING SIGNALS IN ASYNCHRONOUS COOPERATIVE NETWORK

(75) Inventor: Dong Wang, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 338 days.

(21) Appl. No.: 12/746,557

(22) PCT Filed: Dec. 5, 2008

(86) PCT No.: PCT/IB2008/055129
§ 371 (c)(1),
(2), (4) Date: Jun. 7, 2010

(87) PCT Pub. No.: WO2009/074936
PCT Pub. Date: Jun. 18, 2009

(65) Prior Publication Data
US 2010/0260240 A1 Oct. 14, 2010

Related U.S. Application Data

(60) Provisional application No. 61/012,844, filed on Dec. 11, 2007.

(51) Int. Cl.
H04B 7/02 (2006.01)
(52) U.S. Cl.
USPC ........... 375/267; 375/295; 375/259; 375/260; 375/298; 375/211; 375/219
(58) Field of Classification Search
USPC .......... 375/267, 295, 259, 260, 298, 211, 219
See application file for complete search history.

(56) References Cited

U.S. PATENT DOCUMENTS 7,379,477 B2 * 5/2008 Oh et al. ................. 370/480
7,778,598 B2 * 8/2010 Devroye et al. ............ 455/13.4
(Continued)

FOREIGN PATENT DOCUMENTS

WO WO2006121381 A 11/2006

OTHER PUBLICATIONS

Dong Wang et al "Asynchronous Cooperative Communications with STBC Coded Single Carrier Block Transmission" Global Telecommunications Conference, 2007 GLOBECOM '07 IEEE, IEEE, Piscataway, NJ, USA, Nov. 1, 2007, pp. 2987-2991, XP031196494.

(Continued)

Primary Examiner — Kenneth Lam
(74) Attorney, Agent, or Firm — Larry Liberchuk

(57) ABSTRACT

Relay nodes relay data from a source node (110) to a destination node (130) in an asynchronous cooperative wireless communication system. Each relay node (120) includes a serial-to-parallel partitioner (212), a row selector (214), a cyclic shifter (216) and an SCBT modulator (218). The serial-to-parallel partitioner partitions symbols corresponding to received information into parallel blocks. The row selector selects one row of a coding matrix for each of the parallel blocks and constructs symbol blocks corresponding to the parallel blocks based on the selected row. The cyclic shifter shifts a cyclic delay of each of the symbol blocks and generates shifted symbol blocks corresponding to the symbol blocks. The SCBT modulator pads a guard interval to each shifted symbol block to remove the effects of asynchronous relay transmission. Constructing the symbol blocks and generating the shifted symbol blocks provides virtual spatial diversity among the relay nodes, which varies directly with a number of participating relay nodes.

15 Claims, 5 Drawing Sheets

(56) References Cited

U.S. PATENT DOCUMENTS

| | | | |
|---|---|---|---|
| 7,983,334 B2* | 7/2011 | Abou Rjeily | 375/239 |
| 7,995,512 B2* | 8/2011 | Kim et al. | 370/315 |
| 2004/0120274 A1* | 6/2004 | Petre et al. | 370/320 |
| 2005/0031018 A1* | 2/2005 | Papadimitriou et al. | 375/141 |
| 2006/0013186 A1* | 1/2006 | Agrawal et al. | 370/344 |
| 2006/0107171 A1* | 5/2006 | Skraparlis | 714/752 |
| 2007/0165566 A1* | 7/2007 | Khan et al. | 370/329 |
| 2007/0230605 A1* | 10/2007 | Osseiran et al. | 375/260 |
| 2008/0317104 A1* | 12/2008 | Akcaba et al. | 375/211 |
| 2009/0092072 A1* | 4/2009 | Imamura et al. | 370/315 |
| 2009/0092073 A1* | 4/2009 | Doppler et al. | 370/315 |
| 2009/0207930 A1* | 8/2009 | Sirkeci et al. | 375/267 |
| 2009/0313528 A1* | 12/2009 | Chugg et al. | 714/758 |

OTHER PUBLICATIONS

A. Sendonaris, "User Cooperation Diversity—Part 1: System Description" IEEE Transactions on Communications, vol. 51, No. 11, pp. 1927-1938, Nov. 2003.

J. Nicholas Laneman, "Distributed Space-Time-Coded Protocols for Exploiting Cooperative Diversity in Wireless Networks", IEEE Transactions on Information Theory, vol. 49, No. 10, pp. 2415-2425, Oct. 2003.

Yabo Li et al., "A Family of Distributed Space-Time Trellis Codes with Asynchronous Cooperative Diversity", International Conference on Information Processing in Sensor Networks (IPSN), UCLA, Apr. 25-27, 2005.

* cited by examiner

SYSTEM AND METHOD FOR RELAYING SIGNALS IN ASYNCHRONOUS COOPERATIVE NETWORK

A claim of priority under 35 USC §119(e) is made to U.S. Provisional Patent Application No. 61/012,844, filed on Dec. 11, 2007.

Spatial diversity is a technique to counter effects of fading in wireless communication systems. Originally, spatial diversity was achieved through schemes incorporating multiple antennas deployed at the transmitter side and/or the receiver side. Multiple antennas can be used to simultaneously transmit multiple data streams to increase data rates and/or to improve system robustness against fading.

Recently, though, there has been increased research in cooperative communications, in which each node in a communications network is equipped with a single antenna, necessitated by cost and/or size limitations. Virtual multiple input and multiple output (MIMO) structures can be formed to obtain the spatial diversity through antenna sharing in the network. One such implementation is a three-node relay system, consisting of a source node, a relay node and a destination node. For example, in A. Sendonairis et al., "User Cooperation Diversity—Part I: System Description," *IEEE Trans. Comm.*, vol. 51, no. 11, pp. 1927-1938 (November 2003), a general framework for user cooperation was discussed in terms of an achievable rate region and outage probability. Also, J. N. Laneman et al., "Distributed Space-Time-Coded Protocols for Exploiting Cooperative Diversity in Wireless Networks," *IEEE Trans. Info. Theory*, vol. 49, no. 10, pp. 2415-2425 (October 2003), discussed distributed space-time coding for exploiting cooperative diversity in wireless networks.

Unlike MIMO systems having multiple antennas, cooperative systems suffer from asynchronous transmissions of the relay nodes participating in the cooperative communication. Because relay nodes have their own local oscillators and different propagation delays, it is difficult and expensive to maintain sufficient timing synchronization among them. For example, in a system with a symbol rate of 25 Mbaud/s, a propagation distance difference of 25 m results in a propagation delay difference of about 83 ns, which is more than two symbol intervals.

Most conventional space-time codes are designed for synchronous MIMO systems. They therefore can not be used directly in the virtual MIMO case because the asynchronous relay transmissions of relay nodes in virtual MIMO systems destroy the subtle space-time coding structure and thus decrease the performance significantly. In Y. Li et al, "A Family of Distributed Space-Time Trellis Codes with Asynchronous Cooperative Diversity," in *International Conf on Information Processing in Sensor Networks* (IPSN), UCLA, Apr. 25-27, 2005, a new family of row-shiftable space-time trellis codes were proposed for asynchronous cooperative systems. These codes maintain the full rank property under arbitrary asynchronous relay transmission scenarios, thereby avoiding the perfect synchronization requirement. However, the decoding complexity increases exponentially with the maximum synchronization error, which limits its practical applications. Generally, the channel equalization technique in an Alamouti coded system is used to mitigate the effect of asynchronous relay transmissions. However, this method only takes partial advantage of spatial diversity because the asynchronous Alamouti's codes cannot achieve full diversity.

Moreover, all the above mentioned schemes require inter-relay-node coordination to guarantee that different relay nodes transmit different rows of space-time codewords. This inter-relay-node communication complicates the cooperative protocol design and reduces the system efficiency.

In accordance with a representative embodiment, a method is provided for transmitting data from a source node to a destination node through multiple relay nodes in an asynchronous cooperative wireless communication system. The method includes modulating decoded information from a received signal into symbols, partitioning the symbols into parallel blocks and selecting one row of a coding matrix for each of the parallel blocks. An orthogonal structure of the coding matrix is obtained in a frequency domain using the selected row. Cyclic delay of the orthogonal structure is shifted to effectively create multi-paths, to provide multi-path diversity at the destination node.

The coding matrix may be obtained using an Alamouti scheme. Also, obtaining the orthogonal structure of the coding matrix in the frequency domain may include constructing symbol blocks corresponding to the parallel blocks, based on whether a first row or a second row is selected. When a first row is selected, constructing the symbol blocks may include determining symbol blocks $K_{i,m}$, when m is even and odd, respectively:

$$K_{i,m} = [x(mL_r), x(mL_r+1), \ldots, x((m+1)L_r-1)]$$

$$K_{i,m} = [-x^*((m+1)L_r-1), \ldots, -x^*(mL_r+1), -x^*(mL_r)]$$

When a second row is selected, constructing the symbol blocks may include determining symbol blocks $K_{i,m}$, when m is even and odd, respectively:

$$K_{i,m} = [x((m+1)L_r), x((m+1)L_r+1), \ldots, -x((m+2)L_r-1)]$$

$$K_{i,m} = [x^*(mL_r-1), x^*(mL_r-2), \ldots, x^*((m-1)L_r)]$$

Shifting the cyclic delay may include choosing a cyclic delay and generating a shifted symbol block. Choosing the cyclic delay may include choosing a cyclic delay $\tau_i$ randomly from a predefined delay set. Generating the shifted symbol block may then include determining shifted symbol blocks $U_{i,m}$ by applying the following equation, in which $L_r$ is a number of relay-destination channels in a corresponding block $K_{i,m}$ and $\oplus$ denotes modulo-$L_r$ addition:

$$u_{i,m}(t) = k_{i,m}(-\tau_i \oplus t), t=0,1,\ldots,L_r-1,$$

The method may further include padding a guard interval, such that synchronization errors among the effective multi-paths are comparable to multi-path delay and the guard interval removes effects of the multi-path delay. Padding the guard interval may include one of a cyclic prefix or a zero-padding technique. The guard interval may have a length greater than or equal to a sum of a maximum multi-path delay of the relay-destination channels L and a maximum synchronization error among the relay nodes. Accordingly, an output of a relay node i of the multiple relay nodes is as follows, in which $L_g$ denotes guard interval length:

$$\overline{u}_i(m(L_g + L_r) + t) = \begin{cases} u_{i,m}(L_r - L_g + t), t = 0, \ldots, L_g - 1 \\ u_{i,m}(t - L_g), t = L_g, \ldots, L_g + L_r - 1 \end{cases}$$

In accordance with another representative embodiment, a relay node is provided for relaying data from a source node to a destination node in an asynchronous cooperative wireless communication system. The relay node includes a serial-to-parallel partitioner, a row selector and a cyclic shifter. The serial-to-parallel partitioner partitions symbols corresponding to information received from the source node into parallel blocks. The row selector selects one row of a coding matrix for each of the parallel blocks and constructs symbol blocks corresponding to the parallel blocks based on the selected row. The cyclic shifter shifts a cyclic delay of each of the symbol blocks and generates shifted symbol blocks corresponding to the constructed symbol blocks. Constructing the symbol blocks and generating the shifted symbol blocks provides virtual spatial diversity among the relay nodes, the spatial diversity varying directly with a number of participating relay nodes.

The cyclic shifter may randomly choose a cyclic delay for generating the shifted symbol blocks. A guard interval may be padded to each shifted symbol block, which removes effects of multi-path delays among the pseudo multi-paths. Padding the guard interval may include using one of a cyclic prefix or a zero-padding technique. The guard interval may have a length greater than or equal to a sum of a maximum multi-path delay of the relay-destination channels corresponding to the relay nodes and a maximum synchronization error among the relay nodes.

In accordance with yet another representative embodiment, an asynchronous cooperative wireless communication system is provided, including multiple relay nodes for relaying signals transmitted from a source node, and a destination node for receiving processed symbol blocks from the relay nodes. Each relay node includes a serial-to-parallel partitioner for partitioning symbols corresponding to information received in the signals from the source node into parallel blocks; a row selector for selecting one row in a coding matrix for each of the parallel blocks and for constructing symbol blocks corresponding to the parallel blocks based on the selected row; a cyclic shifter for shifting a cyclic delay of each of the symbol blocks and for generating shifted symbol blocks corresponding to the constructed symbol blocks; and a single carrier block transmission (SCBT) modulator for padding a guard interval to each shifted symbol block. The destination node, which receives the padded shifted symbol blocks from the relay nodes, includes a frequency domain transformer for transforming the received symbol blocks from a time domain to a frequency domain after removal of the padded guard interval, and for obtaining channels corresponding to the rows in the coding matrix; a decoder for performing a frequency domain equalization (FDE) of each of the channels; and an inverse frequency domain transformer for transforming the received symbol blocks from a frequency domain to a time domain to estimate symbol vectors of the signals transmitted from the source node. Constructing the symbol blocks and generating the shifted symbol blocks provides virtual spatial diversity among the plurality of relay node.

The FDE may include at least one of a zero-forcing FDE and a minimum mean square error (MMSE) FDE. Also, the frequency domain transformer may include a discrete Fourier transform (DFT) transformer and the inverse frequency domain transformer may include an inverse discrete Fourier transform (IDFT) transformer.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known devices and methods may be omitted so as to not obscure the description of the example embodiments. Such methods and devices are clearly within the scope of the present teachings.

In the various embodiments, an asynchronous cooperative scheme is based on a single carrier block transmission (SCBT) technique, which generally has the capability to tolerate asynchronous relay transmissions and exploit frequency domain diversity under frequency selective channels using frequency domain equalization (FDE). By introducing an orthogonal structure, e.g., of the Alamouti technique in an orthogonal frequency division multiplexing (OFDM) system, and by applying a random cyclic delay diversity (CDD) technique during relay transmissions and using the FDE technique at the receiver, asynchronous received signals from multiple relay nodes can be combined to achieve distributed cooperative diversity. The cyclic delay value of each relay node is independently generated, e.g., in a random manner. Therefore, a priori information about the number of available relay nodes in the system and how other relay nodes are relaying transmissions is not required.

Figure 1:
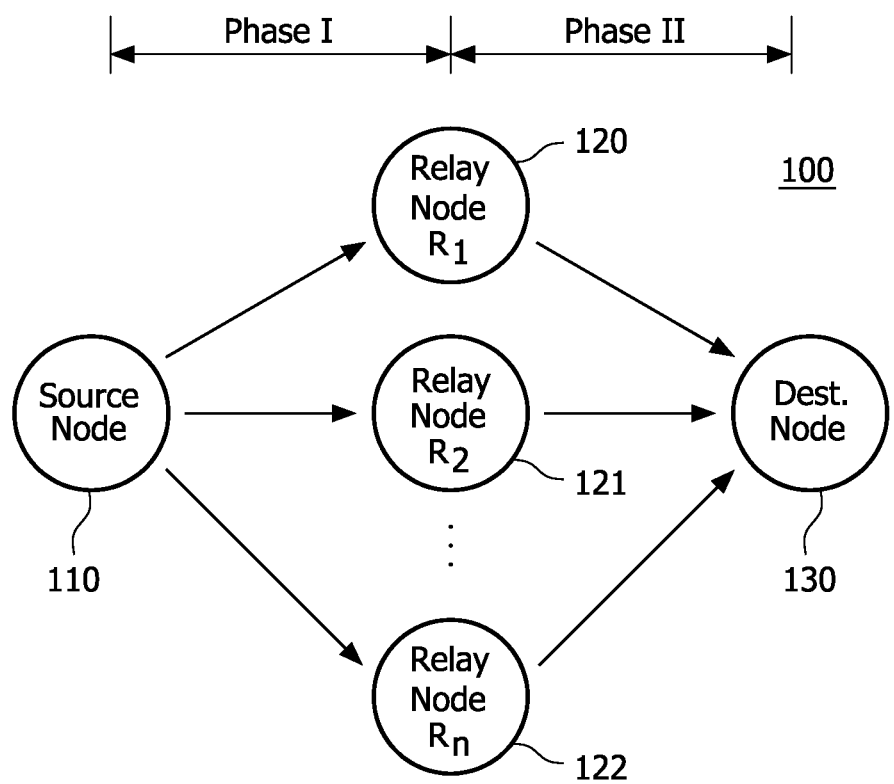
FIG. 1 is a functional block diagram of one embodiment of a wireless communication system.

FIG. 1 is a functional block diagram of one embodiment of an asynchronous cooperative communication system 100. As will be appreciated by those skilled in the art, the various functions shown in FIG. 1 may be physically implemented using a software-controlled microprocessor, hard-wired logic circuits, or a combination thereof. Also, while the functional blocks are illustrated as being segregated in FIG. 1 for explanation purposes, they may be combined in any physical implementation.

The asynchronous cooperative wireless communication system 100 includes a source node 110, multiple relay nodes $R_1, R_2 \ldots R_n$ (indicated by representative relay nodes 120, 121 and 122) and a destination node (e.g., receiver) 130. The source node 110 includes an antenna (not shown) for transmitting signals over a network to at least one of the relay nodes 120-122, during Phase I of a communication between the source node 110 and the destination node 130. Likewise, each of the relay nodes 120-122 includes an antenna system (not shown) for transmitting (relaying) signals from the source node 110 to the destination node 130 during Phase II of the communication. In an embodiment, each relay node 120-122, as well as the destination node 130, deploys one antenna, although multiple antennas may also be used.

In an embodiment, asynchronous cooperative wireless communication system 100 may be a sensor system, for example, in which the source node 110 and the relay nodes 120-122 are remote electronic sensors and the destination node 130 is a monitor that receives sensor information. Such a system may include, for example, communications over wireless local area networks (WLANs), wireless personal area networks (WPANs), and the like.

In Phase I, information is broadcast from the source node 110 to relay nodes 120-122. In Phase II, at least one of the relay nodes 120-122 forwards the received information to the destination node 130 in a cooperative manner. The relay nodes 120-122 may be chosen according to any of a variety of selection techniques. For example, each relay node 120-122 may receive the information from the source node 110 and independently determine whether to participate in a communication based on various existing conditions. For example, relay nodes 120-122 may determine whether to relay a particular communication based predetermined criteria, such as remaining battery life and/or the received signal signal-to-noise ratio (SNR) (e.g., low battery life or low SNR would exclude participation). When a relay node 120-122 decides not to participate, it remains quiet during Phase II.

Generally, there are two types of relay schemes: amplify and forward (AF) based schemes and the decode and forward (DF) based schemes. In the AF schemes, relay nodes 120-122 do not detect information in transmitted information signals, but simply forward the information signals (or transformed versions of the information signals) to the destination node 130, e.g., with some power normalization. In DF schemes, relay nodes 120-122 initially attempt to recover the information from the information signal. When successful, the relay nodes 120-122 re-encode the recovered information and forward the coded signal to the destination node 130. The following description assumes that the relay nodes 120-122 are operating according to a DF scheme. However, the relay nodes 120-122 may operate according to an AF scheme, without departing from the spirit and scope of the present embodiments.

Unlike conventional systems, asynchronous cooperative wireless communication system 100 provides asynchronous relay transmissions and distributed relay transmissions. In other words, there does not need to be inter-node coordination among the relay nodes 120-122. For example, there is no assumption that the relay nodes 120-122 start their relay transmissions simultaneously. Therefore, asynchronous cooperative wireless communication system 100 avoids having to achieve perfect synchronization in a distributed sensor network, for example, which is difficult. Rather, the relay nodes 120-122 achieve only coarse synchronization with the source node 110. For example, relay nodes 120-122 may achieve coarse synchronization with the source node 110 by detecting a training sequence (or preamble) transmitted by the source node 110. In Phase II, each relay node 120-122 may start its relay transmission at any time within $[0, dT_s]$, where $T_s$ denotes symbol interval and $dT_s$ is maximum synchronization error. Further, the relay nodes 120-122 do not need to know global information, such as the total number of relay nodes n in the system 100, and they may independently choose their own cooperative coding method.

When relay nodes utilize conventional space-time codes, for example, to forward source information, asynchronous relay transmissions can destroy the deliberately designed space-time code structure and thus cause diversity gain loss. For example, when there are two relay nodes (n=2) participating in a communication, the two relay nodes may use an Alamouti scheme to relay transmissions. When perfect synchronization can be acquired, the code structure seen at the destination node (receiver) as the following coding matrix:

$$O_2 = \begin{bmatrix} x_1 & -x_2^* \\ x_2 & x_1^* \end{bmatrix} \quad (1)$$

In Equation (1), $x_1$ and $x_2$ are information symbols and * denotes a complex conjugate of the respective information symbols. Under these circumstances, a first relay node may transmit the first row and a second relay node may transmit the second row. An orthogonal system operating in accordance with Equation (1) is able to provide a diversity order of n (e.g., 2).

However, this is not the case when the relay nodes are not synchronized, as in FIG. 1. For example, when the second relay node (e.g., relay node 121) has a $T_s$, relay transmission delay compared to the first relay node (e.g., relay node 120), the code structure seen at the destination node 130 changes to the following coding matrix:

$$\tilde{O}_2 = \begin{bmatrix} x_1 & -x_2^* & \diamond \\ \diamond & x_2 & x_1^* \end{bmatrix} \quad (2)$$

In Equation (2), $\diamond$ denotes interference symbols coming from adjacent space-time blocks. A system operating in accordance with Equation (2) is not orthogonal and can only achieve a diversity order of 1. However, the embodiments described herein achieve a higher diversity order in an asynchronous relay transmission situation.

Further, conventional cooperative schemes require inter-node communications to coordinate relay transmissions, and thus are not really "distributed" solutions. In the above example, indicated by Equation (1), the two relay nodes and the destination node need to coordinate so that they can agree on the relay transmission rules. For example, when Alamouti's construction is applied, the first relay node must use the first row of the Alamouti code and the second relay node must use the second row of the Alamouti code. Without inter-node coordination, the relay nodes may use the same row, in which case the achieved cooperative diversity order will be reduced to 1. In other words, without coordination, there is no guarantee that the maximum available cooperative diversity n will be obtained by the n-node relay system. For example, if n=3 and the three relay nodes use the Alamouti code, then the achieved diversity order is 2, even though the maximum achievable diversity gain is 3. However, inter-node coordination in conventional systems decrease system efficiency and complicate the protocol design.

Figure 2:
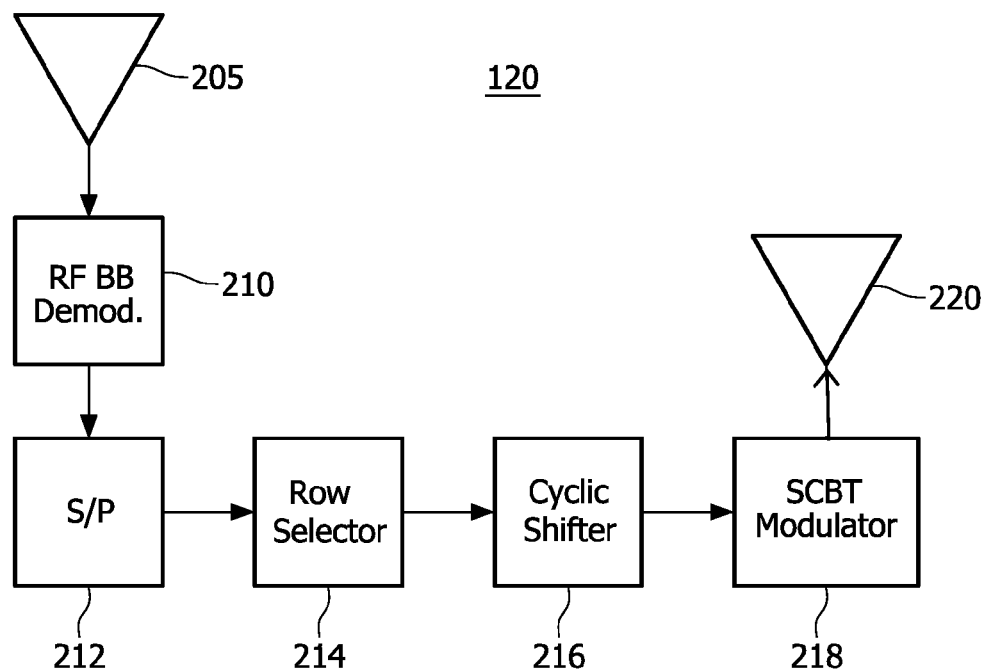
FIG. 2 is a functional block diagram of one embodiment of a relay node in the wireless communication system.

FIG. 2 is a functional block diagram of a representative relay node, e.g. relay node 120 of FIG. 1, in cooperative wireless communication system 100, according to an embodiment. As will be appreciated by those skilled in the art, the various blocks and corresponding functions shown in FIG. 2 may be physically implemented using a software-controlled microprocessor, hard-wired logic circuits, or a combination thereof. Also, while the functional blocks are illustrated as being segregated in FIG. 2 for explanation purposes, they may be combined in any physical implementation.

The relay node 120 includes a receive antenna system 205 and an RF+BB (baseband) demodulator 210 for receiving and demodulating signals from a transmission source (e.g., source node 110). In embodiments incorporating DF based schemes for the relay nodes, it is assumed that relay node 120 correctly decodes the source information and participates in the relay transmission. Received information may be bits modulated into symbols x(m), where m=0, 1, ..., M.

In serial-to-parallel (S/P) block 212, the symbols are partitioned into $L_r$-symbol long blocks, such that the m-th (m=0, ..., M) block of relay node i is defined as follows:

$$X_{i,m} = [x(mL_r), x(mL_r+1), \ldots x((m+1)L_r-1)] \quad (3)$$

Each block $X_{i,m}$ is output to a row selector 214, which randomly selects one row of coding matrix $O_2$ (see Equation 1, above). The row selection is determined locally by each relay node (e.g., relay nodes 120-122), so that there is no coordination needed among the relay nodes. Symbol blocks $K_{i,m}$ corresponding to blocks $X_{i,m}$ are constructed according to the selection, such that $K_{i,m} \cong [k_{i,m}(0), \ldots, k_{i,m}(L_r-1)]$. For example, when the first row is selected by the row selector 214, symbol block $K_{i,m}$ of relay node i may be determined according to the following equations, depending on whether the value of m is even or odd. When m is even, the symbol block $K_{i,m}$ is as follows:

$$K_{i,m} = [x(mL_r), x(mL_r+1), \ldots, x((m+1)L_r-1)] \quad (4)$$

When m is odd, the symbol block $K_{i,m}$ is as follows:

$$K_{i,m} = [-x^*((m+1)L_r-1), \ldots, -x^*(mL_r+1), -x^*(mL_r)] \quad (5)$$

Likewise, when the second row is selected by the row selector 214, $K_{i,m}$ is determined according to the following equations, depending on whether the value of m is even or odd. When m is even, the symbol block $K_{i,m}$ is as follows:

$$K_{i,m} = [x((m+1)L_r), x((m+1)L_r+1), \ldots, -x((m+2)L_r-1)] \quad (6)$$

When m is odd, the symbol block $K_{i,m}$ is as follows:

$$K_{i,m} = [x^*(mL_r-1), x^*(mL_r-2), \ldots, x^*((m-1)L_r)] \quad (7)$$

By determining the symbol block $K_{i,m}$ according to the above Equations (4)-(7), the orthogonal structure of coding matrix $O_2$ in the frequency domain may be obtained, since the discrete Fourier transform (DFT) has the following property: if $x(n) \leftrightarrow X(k)$, then $x^*(N-n) \leftrightarrow X^*(k)$, where N is the DFT size.

With the orthogonal structure (and the FDE technique), the destination node 130 can achieve cooperative diversity. However, use of the row selector 214 achieves at most a diversity gain of two, even when more than two relay nodes are available, because coding matrix $O_2$ has only two rows. In order to achieve additional cooperative diversity, adaptive to the number of relay nodes $R_1, R_2 \ldots R_n$ (e.g., relay nodes 120-122) and hence exploit the available diversity gain more efficiently, a cyclic shifter 216 is provided in each relay node. The cyclic shifter 216 provides a random CDD technique during relay transmissions, e.g., randomly shifting cyclic delay.

For example, the relay node 120 of FIG. 2 chooses a cyclic delay $\tau_i$ randomly from a predefined delay set $\Gamma$. The relay node then generates the symbol block $U_{i,m} \cong [u_{i,m}(0), \ldots, u_{i,m}(L_r-1)]$ by the following equation, in which $\otimes$ denotes modulo-$L_r$ addition:

$$u_{i,m}(t) = k_{i,m}(-\tau_i \oplus t), t = 0, 1, \ldots, L_r-1 \quad (8)$$

Accordingly, the cyclic delay operation of the cyclic shifter 216 creates pseudo multi-paths, so that the receiving destination node 130 (FIG. 3) can combine the received signal from different paths properly to achieve multi-path diversity provided by cooperative communications. In other words, the cyclic delay operation of the cyclic shifter 216 makes the equivalent channels frequency-selective. Therefore, the FDE technique can be used by the destination node 130 to achieve frequency diversity gain. Generally, the CDD operation inherently achieves a diversity order increasing linearly with the number of relay nodes, as indicated by the simulation results depicted in FIG. 6, for example. Accordingly, overall communication quality increases as the number of relay nodes increases.

The SCBT modulator 218 pads each block with a guard interval. The guard interval may have a length greater than or equal to the sum of the maximum multi-path delay of the relay-destination channels L and the maximum synchronization errors among the relay nodes $R_1, R_2 \ldots R_n$, using a cyclic prefix or zero-padding technique. An output of the guard-interval-padding operation of relay node 120 (e.g., Ri) may be defined as follows, in which $L_g$ denotes guard interval length:

$$\bar{u}_i(m(L_g + L_r) + t) = \begin{cases} u_{i,m}(L_r - L_g + t), t = 0, \ldots, L_g - 1 \\ u_{i,m}(t - L_g), t = L_g, \ldots, L_g + L_r - 1 \end{cases} \quad (9)$$

The synchronization errors among relay nodes $R_1, R_2 \ldots R_n$ can be considered multi-path delay, among pseudo multi-paths. Accordingly, the added guard interval can effectively remove the effect of asynchronous transmissions, i.e., by removing the multi-path effect. The output symbol sequence $\bar{u}_i(t)$ is modulated by the SCBT modulator 218 for transmission through antenna system 220 to the destination node or receiver 130.

Figure 3:
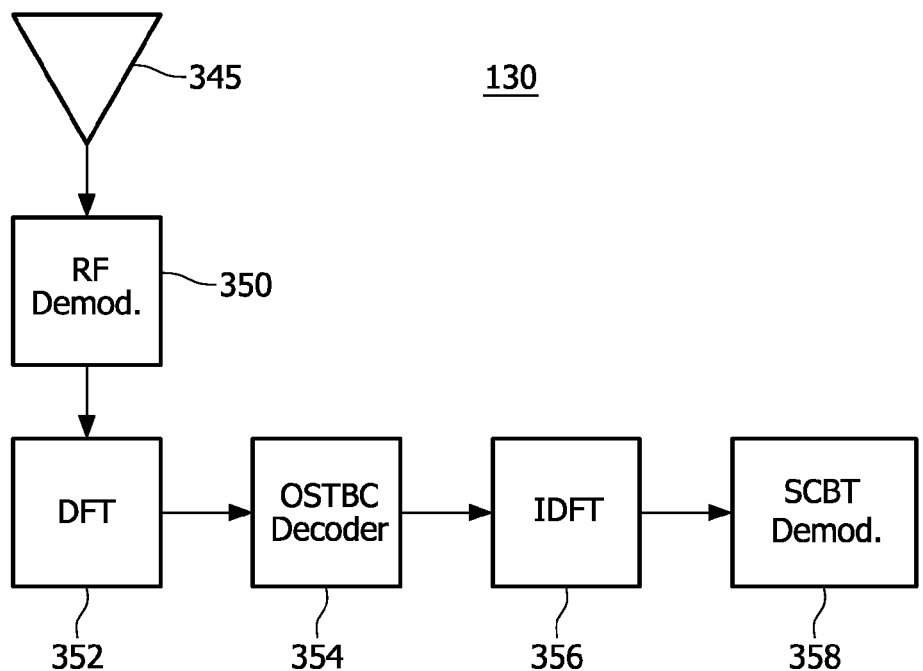
FIG. 3 is a functional block diagram of one embodiment of a receiver in the wireless communication system.

Referring to FIG. 3, the destination node or receiver 130 has a single receive antenna 345, for example, although in various embodiments the destination node 130 may include multiple receive antennas without departing from the spirit and scope of the embodiments. Further, as will be appreciated by those skilled in the art, the various blocks and corresponding functions shown in FIG. 3 may be physically implemented using a software-controlled microprocessor, hard-wired logic circuits, or a combination thereof. Also, while the functional blocks are illustrated as being segregated in FIG. 3 for explanation purposes, they may be combined in any physical implementation.

The destination node 130 includes an RF demodulator 350 for demodulating the signal received from the relay node 120, discussed above, as well as any additional participating relay nodes, such as relay nodes 121 and 122. The RF demodulator 350 may output a baseband received symbol sequence. The received baseband symbol at time t may be defined as follows:

$$\bar{r}(t) = \sum_{i=1}^{n} \sum_{l=0}^{L} g_{i,l} \bar{u}_i(t-l) + v_t \quad (10)$$

In Equation (10), v, denotes additive white Gaussian noise (AWGN) with variance of $\sigma^2$. The variabable $g_{i,l}$ denotes a fading coefficient of the channel from the i-th relay node (e.g., relay node 120) to the destination node (e.g., receiver 130) with a delay of l.

The received signal may be partitioned into blocks and the guard interval removed, once the starting point of each block is determined, to provide a received signal block $r_m$ to DFT block 352. The m-th received signal block is defined as follows:

$$r_m = [\bar{r}(m(L_g+L_r)+L_g), \ldots, \bar{r}((m+1)(L_g+L_r)-1)] \quad (11)$$

The DFT block 352 transforms the received signal blocks $r_m$ into the frequency domain. The resulting corresponding frequency domain signal blocks are defined as follows:

$$\vec{q}_m = W_{L_r} r_m \quad (12)$$

In Equation (12), $W_{L_r}$ denotes an $L_r$-point DFT matrix. Accordingly, the frequency domain signals in the 2b-th block and the (2b+1)-th block may be grouped together as follows:

$$\begin{bmatrix} \vec{q}_{2b}(k) \\ \vec{q}_{2b+1}(k) \end{bmatrix} = \begin{bmatrix} S_{2b,k} & S_{2b+1,k} \\ -S_{2b+1,k}^* & S_{2b,k}^* \end{bmatrix} * \begin{bmatrix} f_{1,k} \\ f_{2,k} \end{bmatrix} + \begin{bmatrix} l_{2b,k} \\ l_{2b+1,k} \end{bmatrix} \quad (13)$$

In Equation (13), $l_{2b,k}$ and $l_{2b+1,k}$ denote the frequency domain AWGN terms on subcarrier k, and $f_{1,k}$ and $f_{2,k}$ denote the k-subcarrier ($0 \le k \le L_r-1$) channel parameters of the synthetic frequency domain channels corresponding to the first row and the second row of coding matrix $O_1$, respectively. The channel parameters $f_{1,k}$ and $f_{2,k}$ can be obtained as follows:

$$f_{1,k} = \sum_{i \in Y_1} \sum_{l=0}^{L} g_{i,l} e^{\frac{-j2\pi k(\tau_l+1)}{L_r}} \quad (14)$$

$$f_{2,k} = \sum_{i \in Y_2} \sum_{l=0}^{L} g_{i,l} e^{\frac{-j2\pi k(\tau_l+1)}{L_r}} \quad (15)$$

In Equations (14) and (15), Y1 and Y2 denote an index set of relay nodes selecting the first and second rows of coding matrix $O_2$, respectively. In an embodiment, the receiver 130 need only estimate synthetic channels $f_{1,k}$ and $f_{2,k}$, instead of every channel $g_{i,l}$ from source node to relay node to destination node. The relay nodes 120-122 may thus transmit pre-designed training sequences to support channel estimation at the receiver 130. More specifically, each relay node 120-122 constructs a row-selected space-time coded and cyclic-shifted version of a pre-determined training sequence using its own parameters. The pre-determined training sequence is transmitted before the data portion from each relay node 120-122. For each value of n, only two training symbol blocks are required. Accordingly, the embodiment has good scalability with network node density.

With respect to $f_{1,k}$ and $f_{2,k}$, the OSTBC Decoder 354 performs orthogonal STBC decoding in the frequency domain, including zero-forcing (ZF) FDE and minimum mean square error (MMSE) FDE. The orthogonal STBC decoding is defined according to the following equation, in which H denotes a complex conjugate rotate operation:

$$\begin{bmatrix} \tilde{S}_{2b,k} \\ \tilde{S}_{2b+1,k} \end{bmatrix} = \begin{bmatrix} f_{1,k} & f_{2,k} \\ f_{2,k}^* & -f_{1,k}^* \end{bmatrix}^H \begin{bmatrix} \vec{q}_{2b}(k) \\ \vec{q}_{2b+1}^* \end{bmatrix} \quad (16)$$

The zero-forcing FDE can be performed as follows:

$$\begin{bmatrix} \hat{S}_{2b,k} \\ \hat{S}_{2b+1,k} \end{bmatrix} = \frac{1}{|f_{1,k}|^2 + |f_{2,k}|^2} \begin{bmatrix} \tilde{S}_{2b,k} \\ \tilde{S}_{2b+1,k} \end{bmatrix} \quad (17)$$

The MMSE FDE can be performed as follows:

$$\begin{bmatrix} \hat{S}_{2b,k} \\ \hat{S}_{2b+1,k} \end{bmatrix} = \frac{1}{|f_{1,k}|^2 + |f_{2,k}|^2 + \sigma^2} \begin{bmatrix} \tilde{S}_{2b,k} \\ \tilde{S}_{2b+1,k} \end{bmatrix} \quad (18)$$

The inverse DFT block 356 then obtains an estimation of the b-th transmission symbol vector, indicated as follows:

$$\vec{s}_b = W_{N_s}^{-1} \hat{S}_b \quad (19)$$

The inverse DFT operation of the inverse DFT block 356 efficiently exploits the "multi-path" diversity (i.e., using the pseudo multi-paths) introduced by the cyclic shift operation performed by the cyclic shifter 216 at each relay node (e.g., relay node 120).

Figure 4:
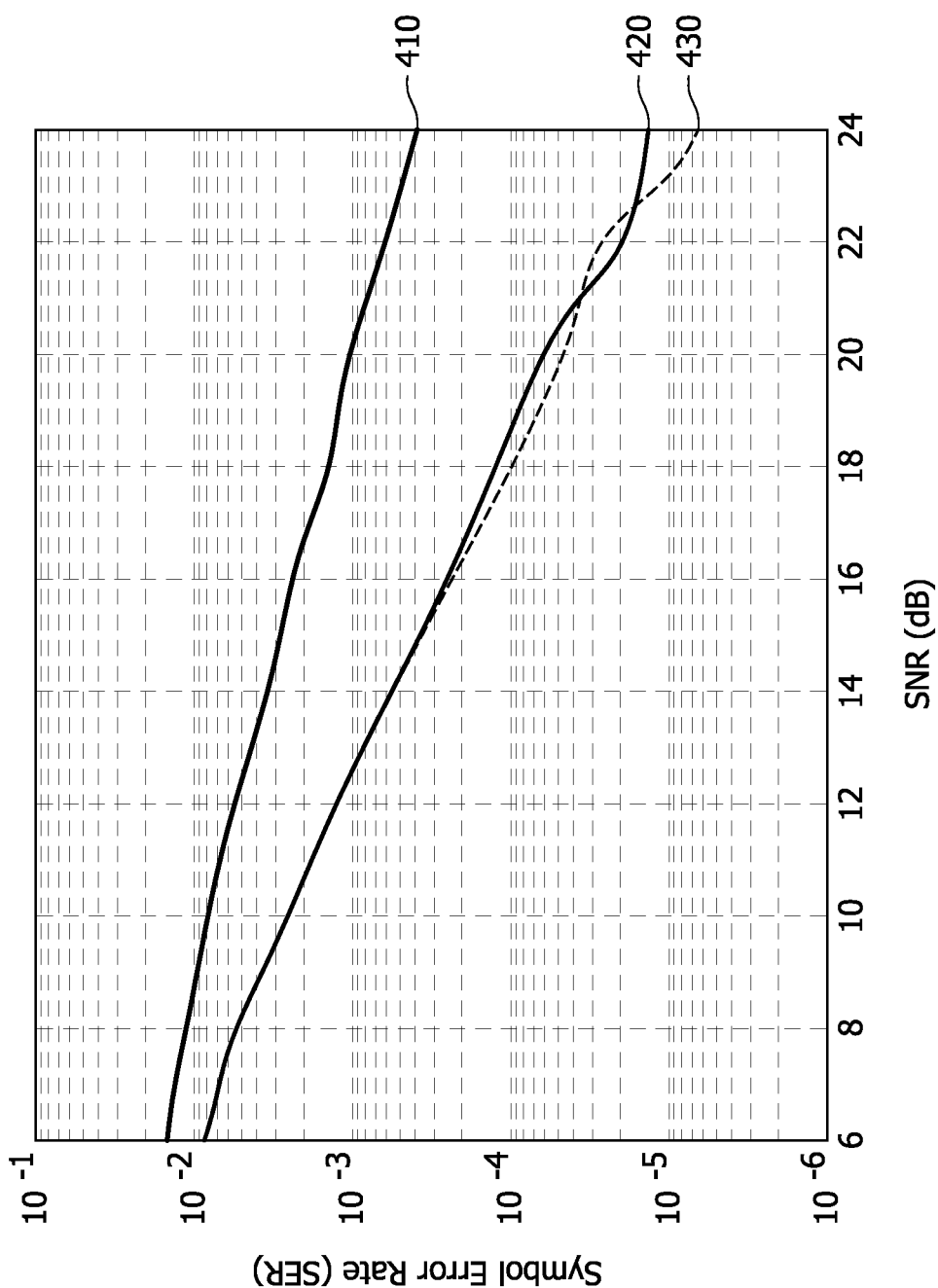
FIG. 4 is a graph comparing performance of the embodiments with synchronous and asynchronous systems.
Figure 5:
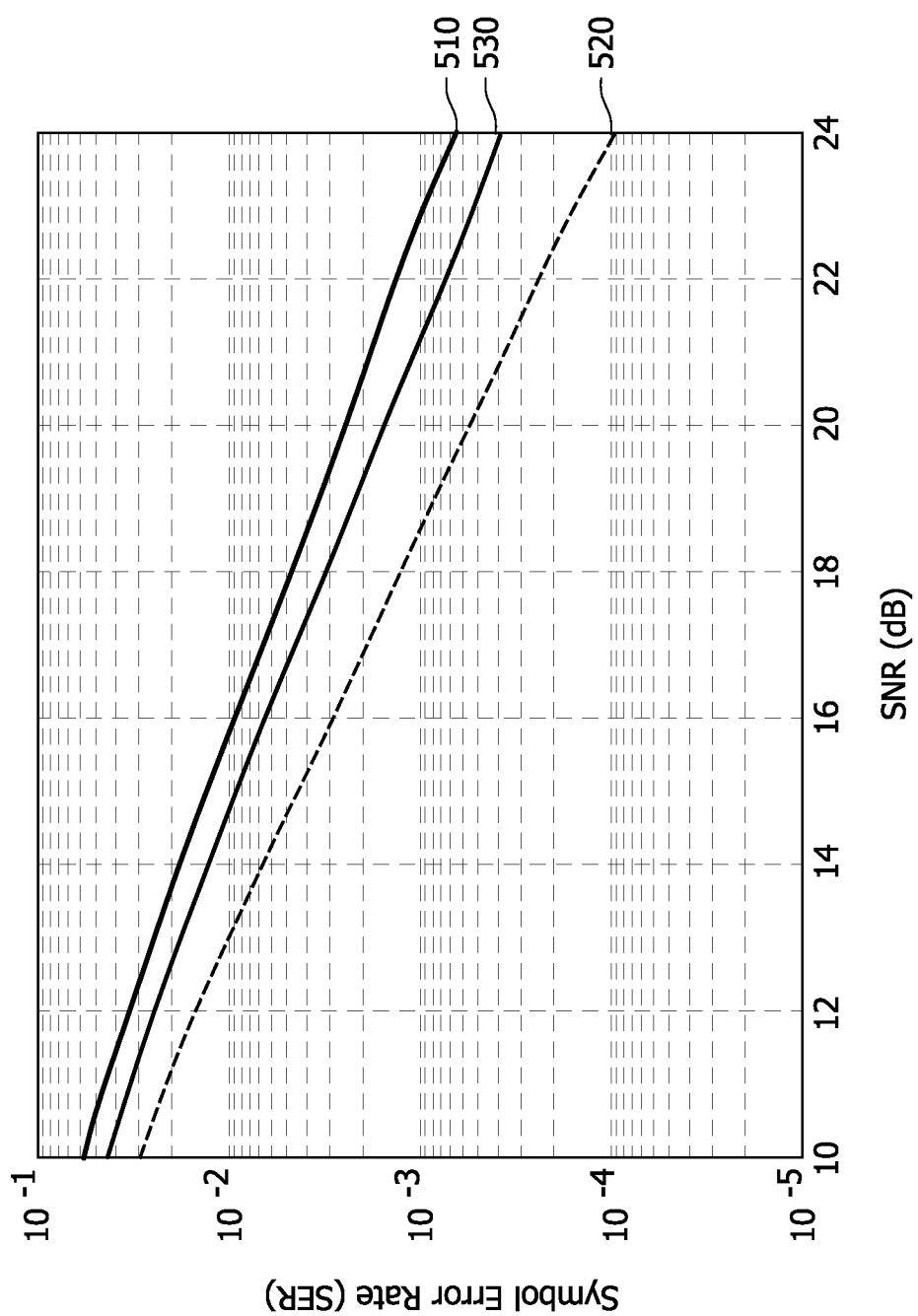
FIG. 5 is a graph comparing random row selection of the embodiments with other systems not using random row selection.
Figure 6:
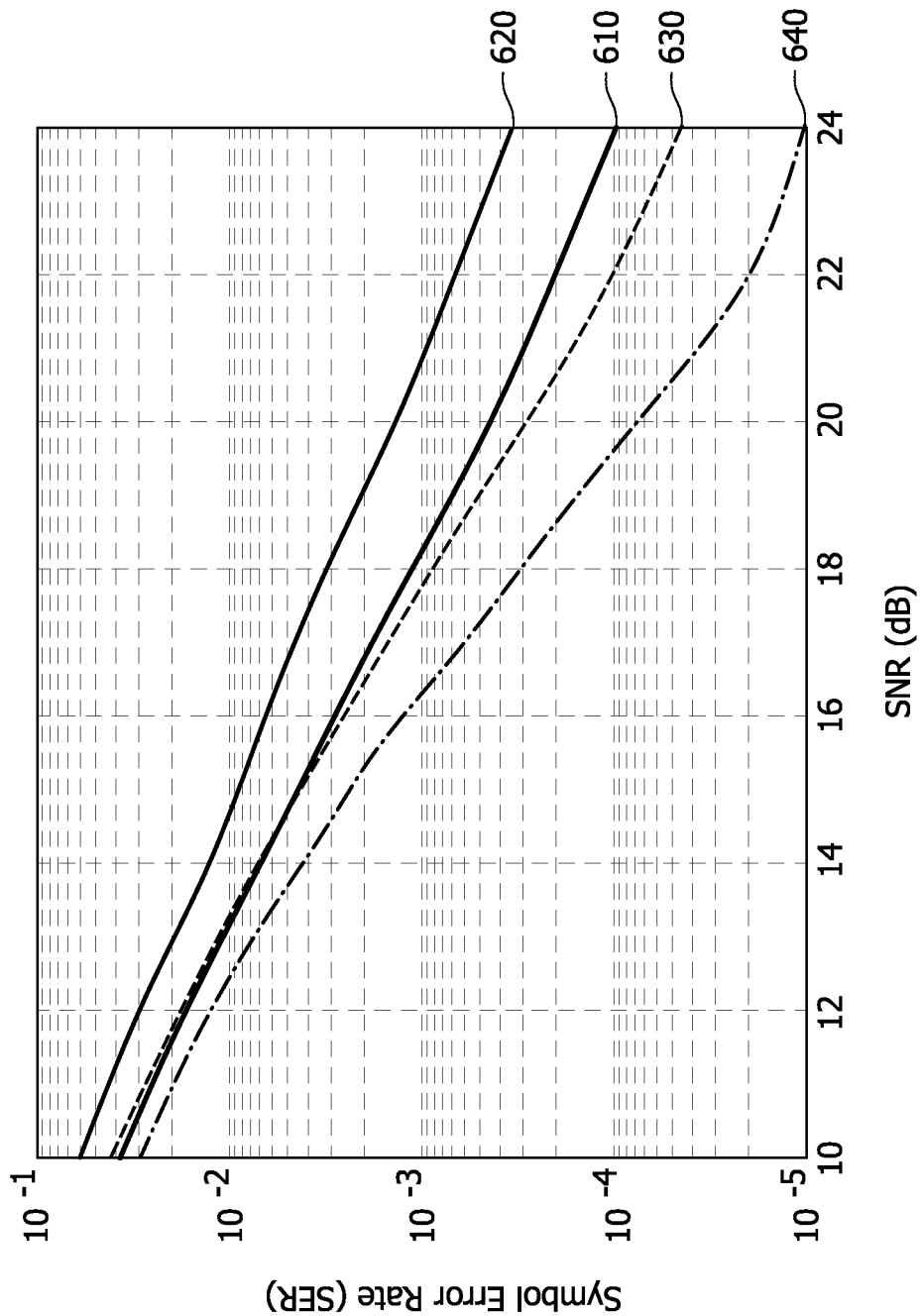
FIG. 6 is a graph comparing performance of embodiments having various numbers of relay nodes and a synchronous system.

FIGS. 4-6 depict comparative simulation results of the various embodiments. The simulations included DF based relay nodes (e.g., relay node 120-122), although various embodiments may cover AF and DF based relay nodes, as stated above. Further, it is assumed that the relay nodes 120-122 correctly detect the transmitted symbols from the source node 110. In addition, the channel model may be flat-fading and quasi-static, which means that L=0, the channel parameters $g_{i,0}$, wherein i=1, . . . , n are independent Gaussian random variables with unit variance, which remain unchanged in each frame but change from frame to frame. In the depicted simulations, each frame has two symbol blocks and each symbol block has $L_r=64$ quadrature phase shift keying (QPSK) symbols, for example.

FIG. 4 shows the effects of asynchronous relay transmissions in terms of symbol error ratio (SER), measured in decibels (dB). In the depicted simulations, two relay nodes (n=2) participate in the cooperative relay transmission. Each of the relay nodes use different rows of coding matrix $O_2$ to transmit. FIG. 4 comparatively depicts three curves 410, 420 and 430, labeled "Async. OSTBC," "Sync. OSTBC" and "Cooperative Scheme," respectively. For curve 410, depicting an asynchronous OSTBC transmission, it is assumed that there is one symbol interval synchronization difference between the two relay nodes, while for curve 420, depicting a synchronous OSTBC transmission, it is assumed that the two relay nodes are synchronized. Referring to FIG. 4, the slope of curve 410 is less than that of curve 420, indicating that the symbol error rate decreases more in the synchronous OSTBC transmission as SNR increases. The performance indicated by curve 410 is significantly degraded, e.g., due to the asynchronous relay transmissions.

In comparison, the simulation results depicted by curve 430 correspond to the various embodiment described above. Curve 430 indicates nearly the same performance as that of curve 420. This is true even though a random synchronization error is included in the simulation depicted by curve 430, and there is no diversity gain loss caused by asynchronous relay transmissions. FIG. 4 thus demonstrates that the disclosed embodiments are robust in view of relay synchronization errors.

FIG. 5 shows random row selection in terms of SER, measured in dB. In the depicted simulations, n=2 relay nodes participate in the cooperative relay transmission. FIG. 5 comparatively depicts three curves 510, 520 and 530, labeled "Row 1 selected," "Sync. OSTBC" and "Random Row selection," respectively. Curve 510 depicts the case in which both relay nodes use only the first row of coding matrix $O_2$ to perform their relay transmissions. Curve 520 depicts the case in which the two relay nodes are synchronized, and the relay nodes use different rows of $O_2$ to transmit. In comparison, curve 530 depicts the case, according to various embodiments, in which the two relay nodes independently and randomly choose one row of $O_2$ to perform their relay transmissions. For both curves 510 and 530, a random synchronization error $\tau T_s$ is assumed, where $\tau$ is uniformly distributed in [0, 5].

Curve 510 indicates the worst performance, which is expected since the virtual spatial diversity only comes from the pseudo multi-path diversity caused by the synchronization error, and not from the frequency domain orthogonal structure $O_2$. In comparison, curve 530 indicates almost 2 dB gain over curve 510. However, as indicated by its slope, curve 530 does not achieve full diversity, since with a probability of 0.5, the two relay nodes may choose the same row, causing a diversity gain loss. In fact, since the achieved diversity order is determined by the worst case, the Random Row selection scheme 530 essentially achieves the same diversity order as the Row 1 selected scheme 510, although curve 530 depicts an improvement over curve 510, as a practical matter. Curve 520, corresponding to the synchronized OSTBC system, indicates the best performance. This is because the orthogonal structure of $O_2$ guarantees full spatial diversity.

FIG. 6 shows the effect of varying the number off relay nodes n in simulations, performed in accordance with various embodiments, in terms of SER measured in dB. In the depicted simulations, n=2 relay nodes participate in the cooperative relay transmission. Each of the relay nodes use different rows of coding matrix $O_2$ to transmit. Curve 610 depicts the case in which two relay nodes are synchronized, as discussed above. In addition, FIG. 6 comparatively depicts curves 620, 630 and 640, corresponding to n=2 nodes, n=3 nodes and n=4 nodes, respectively.

FIG. 6 shows that the diversity order achieved by the various embodiments increases as the number of relay node n increases. For example, when n>2, the depicted systems achieve higher diversity gains than the synchronized system, indicated by curve 610. Further, by comparing curve 520 of FIG. 5 and curve 610 of FIG. 6, it is evident that there is no improvement in performance in the synchronized system when the number of relay nodes n increases. This is because the diversity gain is limited by the structure of $O_2$ in the synchronized system. Curves 620, 630 and 640 indicate that performance improves as the number of relay nodes n increase, thus showing good scalability of the embodiments.

Accordingly, random row selection and the random cyclic delay diversity techniques discussed above efficiently exploit available cooperative diversity. Embodiments of the asynchronous cooperative communication system based on SCBT are robust to multi-path fading and synchronization errors among the relay nodes. Also, the relay nodes are distributed in nature, and no inter-node coordination is involved. There is good scalability with network node density, and the available diversity is efficiently exploited. Further, the asynchronous cooperative communication system only estimates "synthesized" channels (e.g., in an Alamouti scheme, only two channels) instead of all source-relay-destination channels, which reduces channel estimation overhead. As stated above, both AF and DF relay nodes may be included.

Various embodiments may include MIMO-OFDM data communication systems in which multiple antennas are used to achieve high data rates, such as IEEE802.11n WLAN, 3G WCDMA HSDPA, WiMax and MB-OFDM based WiMedia UWB systems. Further, a WiMedia UWB system may be a MIMO UWB system, according to various embodiments, since many of the baseband components of the WiMedia UWB system may be incorporated.

While preferred embodiments are disclosed herein, many variations are possible which remain within the concept and scope of the present teachings. Such variations would become clear to one of ordinary skill in the art after inspection of the specification, drawings and claims herein. The present teachings therefore are not to be restricted except within the spirit and scope of the appended claims.

What is claimed is:

1. A method for transmitting data from a source node to a destination node through a plurality of relay nodes in an asynchronous cooperative wireless communication system, the method comprising:

modulating decoded information from a received signal into symbols;

partitioning the symbols into parallel blocks;

selecting one row of a coding matrix for each of the parallel blocks;

obtaining an orthogonal structure of the coding matrix in a frequency domain using the selected row;

shifting cyclic delay of the orthogonal structure to effectively create multi-paths, to provide multi-path diversity at the destination node by choosing a cyclic delay $\tau_i$ randomly from a predefined delay set and generating a shifted symbol block; and padding a guard interval, the guard interval having a length greater than or equal to a sum of a maximum multi-path delay of the relay-destination channels L and a maximum synchronization error among the plurality of relay nodes.

2. The method of claim 1, wherein the coding matrix is obtained using an Alamouti scheme.

3. The method of claim 2, wherein obtaining the orthogonal structure of the coding matrix in the frequency domain comprises constructing symbol blocks corresponding to the parallel blocks.

4. The method of claim 3, wherein when a first row is selected, constructing the symbol blocks comprises determining symbol blocks such that, $$K_{i,m}=[x(mL_r),x(mL_r+1),\ldots,x((m+1)L_r-1)],$$

when m is even, and $$K_{i,m}=[-x^*((m+1)L_r-1),\ldots,-x^*(mL_r+1),-x^*(mL_r)],$$

when m is odd.

5. The method of claim 3, wherein when a second row is selected, constructing the symbol blocks comprises determining symbol blocks $K_{i,m}$, such that, $$K_{i,m}=[x((m+1)L_r),x((m+1)L_r+1),\ldots,-x((m+2)L_r-1)],$$

when m is even, and $$K_{i,m}[x^*(mL_r-1),x^*(mL_r-2),\ldots,x^*((m-1)L_r)],$$

when m is odd.

6. The method of claim 1, wherein generating the shifted symbol block comprises determining shifted symbol blocks $U_{i,m}$ by applying the following equation:

$$u_{i,m}(t)=k_{i,m}(-\tau_i \oplus t), t=0,1,\ldots,L_r-1,$$

in which $L_r$ is a number of relay-destination channels in a corresponding block $K_{i,m}$ and $\oplus$ denotes modulo-$L_r$ addition.

7. The method of claim 1, wherein synchronization errors among the effective multi-paths are comparable to multi-path delay and the guard interval removes effects of the multi-path delay.

8. The method of claim 7, wherein padding the guard interval comprises one of a cyclic prefix or a zero-padding technique.

9. The method of claim 1, wherein an output of a relay node i of the plurality of relay nodes is defined as follows:

$$\bar{u}_i(m(L_g+L_r)+t) = \begin{cases} u_{i,m}(L_r-L_g+t), t=0,\ldots,L_g-1 \\ u_{i,m}(t-L_g), t=L_g,\ldots,L_g+L_r-1 \end{cases}$$

in which $L_g$ denotes guard interval length.

10. A relay node of a plurality of relay nodes for relaying data from a source node to a destination node in an asynchronous cooperative wireless communication system, the relay node comprising:

a serial-to-parallel partitioner for partitioning symbols corresponding to information received from the source node into parallel blocks;

a row selector for selecting one row of a coding matrix for each of the parallel blocks and for constructing symbol blocks corresponding to the parallel blocks based on the selected row; and a cyclic shifter for shifting a cyclic delay of each of the symbol blocks and for generating shifted symbol blocks corresponding to the constructed symbol blocks, the cyclic delay being chosen randomly from a predefined set, wherein constructing the symbol blocks and generating the shifted symbol blocks provides virtual spatial diversity among the plurality of relay nodes, the spatial diversity varying directly with a number of participating relay nodes in the plurality of relay nodes; and wherein a guard interval may be padded to each shifted symbol block, the guard interval having a length greater than or equal to a sum of a maximum multi-path delay of the relay-destination channels corresponding to the plurality of relay nodes and a maximum synchronization error among the plurality of relay nodes.

11. The relay node of claim 10, wherein when the row selector selects a first row of the coding matrix, the row selector constructs the symbol blocks by determining symbol blocks $K_{i,m}$, such that, $$K_{i,m}=[x(mL_r),x(mL_r+1),\ldots,x((m+1)L_r-1)],$$

when m is even, and $$K_{i,m}=[-x^*((m+1)L_r-1),\ldots,-x^*(mL_r+1),-x^*(mL_r)],$$

when m is odd; and wherein when the row selector selects a second row of the coding matrix, the row selector constructs the symbol blocks by determining symbol blocks $K_{i,m}$, such that, $$K_{i,m}=[x((m+1)L_r),(x((m+1)L_r+1),\ldots,-x((m+2)L_r-1)],$$

when m is even, and $$K_{i,m}=[x^*(mL_r-1),x^*(mL_r-2),\ldots,x^*((m-1)L_r)],$$

when m is odd.

12. The relay node of claim 10, wherein the guard interval is padded using one of a cyclic prefix or a zero-padding technique.

13. An asynchronous cooperative wireless communication system, comprising:

a plurality of relay nodes configured to relay signals transmitted from a source node, each relay node of the plurality of relay nodes comprising:

a serial-to-parallel partitioner for partitioning symbols corresponding to information received in the signals from the source node into parallel blocks;

a row selector for selecting one row of a plurality of rows in a coding matrix for each of the parallel blocks and for constructing symbol blocks corresponding to the parallel blocks based on the selected row;

a cyclic shifter for shifting a cyclic delay of each of the symbol blocks and for generating shifted symbol blocks corresponding to the constructed symbol blocks, the cyclic delay being chosen randomly from a predefined set; and a single carrier block transmission (SCBT) modulator for padding a guard interval to each shifted symbol block, the guard interval having a length greater than or equal to a sum of a maximum multi-path delay of the relay-destination channels corresponding to the plurality of relay nodes and a maximum synchronization error among the plurality of relay nodes; and a destination node for receiving the padded shifted symbol blocks from the plurality of relay nodes, the designation node comprising:

a frequency domain transformer for transforming the received symbol blocks from a time domain to a frequency domain, after removal of the padded guard interval, and for obtaining a plurality of channels corresponding to the plurality of rows in the coding matrix;

a decoder for performing a frequency domain equalization (FDE) of each of the plurality of channels; and an inverse frequency domain transformer for transforming the received symbol blocks from a frequency domain to a time domain to estimate symbol vectors of the signals transmitted from the source node, wherein constructing the symbol blocks and generating the shifted symbol blocks provides virtual spatial diversity among the plurality of relay node.

14. The system of claim 13, wherein the FDE comprises at least one of a zero-forcing FDE and a minimum mean square error (MMSE) FDE.

15. The system of claim 14, wherein the frequency domain transformer comprises a discrete Fourier transform (DFT) transformer and the inverse frequency domain transformer comprises an inverse discrete Fourier transform (IDFT) transformer.

* * * * *